United States Patent
Narendra et al.

(10) Patent No.: US 7,364,092 B2
(45) Date of Patent: Apr. 29, 2008

(54) ELECTRONIC STRIPE CARDS

(75) Inventors: Siva G. Narendra, Portland, OR (US); Prabhakar Tadepalli, Bangalore (IN); Thomas N. Spitzer, Portland, OR (US)

(73) Assignee: Tyfone, Inc., Portland, OR (US)

( * ) Notice: Subject to any disclaimer, the term of this patent is extended or adjusted under 35 U.S.C. 154(b) by 0 days.

(21) Appl. No.: 11/488,400

(22) Filed: Jul. 18, 2006

(65) Prior Publication Data

US 2007/0023532 A1    Feb. 1, 2007

Related U.S. Application Data

(60) Provisional application No. 60/700,200, filed on Jul. 18, 2005, provisional application No. 60/700,089, filed on Jul. 18, 2005, provisional application No. 60/700,248, filed on Jul. 18, 2005.

(51) Int. Cl.
    *G06K 19/06*    (2006.01)

(52) U.S. Cl. ............... 235/494; 235/449; 235/451; 235/492; 235/439

(58) Field of Classification Search ............... 235/449, 235/451, 492, 439
See application file for complete search history.

(56) References Cited

U.S. PATENT DOCUMENTS

| | | | |
|---|---|---|---|
| 4,081,132 A * | 3/1978 | Pearce | 235/493 |
| 4,791,604 A * | 12/1988 | Lienau et al. | 365/9 |
| 6,039,260 A | 3/2000 | Eisele | |
| 6,176,433 B1 * | 1/2001 | Uesaka et al. | 235/492 |
| 6,308,890 B1 * | 10/2001 | Cooper | 235/449 |
| 6,387,476 B1 * | 5/2002 | Iwasaki et al. | 428/212 |
| 6,614,211 B1 * | 9/2003 | Douglas | 324/67 |
| 2002/0006058 A1 * | 1/2002 | Nakajima et al. | 365/171 |
| 2004/0257862 A1 * | 12/2004 | Anthony et al. | 365/158 |

FOREIGN PATENT DOCUMENTS

| | | |
|---|---|---|
| WO | WO-9626500 A1 | 8/1996 |
| WO | WO-2004095169 A2 | 11/2004 |
| WO | WO-2005027030 A1 | 3/2005 |
| WO | WO-2007011937 A2 | 1/2007 |

* cited by examiner

*Primary Examiner*—Steven S. Paik
*Assistant Examiner*—Tuyen Kim Vo
(74) *Attorney, Agent, or Firm*—Dana B. LeMoine; LeMoine Patent Services

(57) ABSTRACT

An electronic stripe card senses when it is being swiped passed a read head, and drives a conductive path to mimic a magnetic card track. Multiple conductive paths may be driven in an interleaved fashion one after another. The card may include multiple swipe sensors to detect when to start and stop driving the conductive paths. The conductive paths may include traces on a top metal layer and bottom metal layer without magnetic material therebetween.

20 Claims, 6 Drawing Sheets

ELECTRONIC STRIPE CARDS

RELATED APPLICATIONS

Benefit is claimed under 35 U.S.C. 119(e) to U.S. Provisional Application Ser. No. 60/700,200, entitled "Field Generation without Magnetic Material for Electronic Stripe" by Narendra et al., filed Jul. 18, 2005, which is herein incorporated in its entirety by reference for all purposes.

Benefit is also claimed under 35 U.S.C. 119(e) to U.S. Provisional Application Ser. No. 60/700,089, entitled "Swipe Sensor for Electronic Stripe Energy Reduction" by Narendra et al., filed Jul. 18, 2005, which is herein incorporated in its entirety by reference for all purposes.

Benefit is also claimed under 35 U.S.C. 119(e) to U.S. Provisional Application Ser. No. 60/700,248, entitled "Interleaved Track Driving" by Narendra et al., filed Jul. 18, 2005, which is herein incorporated in its entirety by reference for all purposes.

FIELD

The present invention relates generally to magnetic field generation, and more specifically to magnetic field generation in cards.

BACKGROUND

Figure 1:
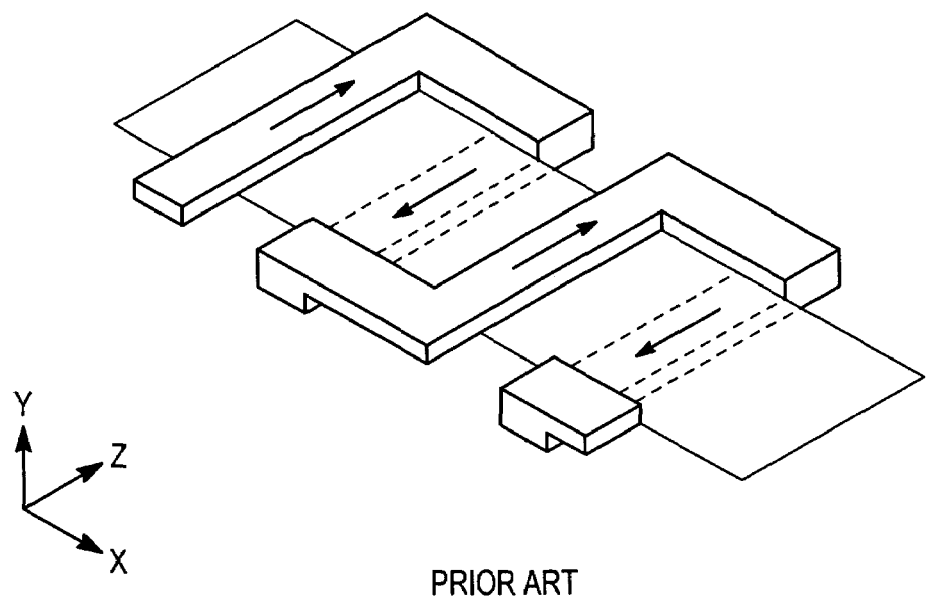
FIGS. 1 and 2 show prior art magnetic field generation.
Figure 2:
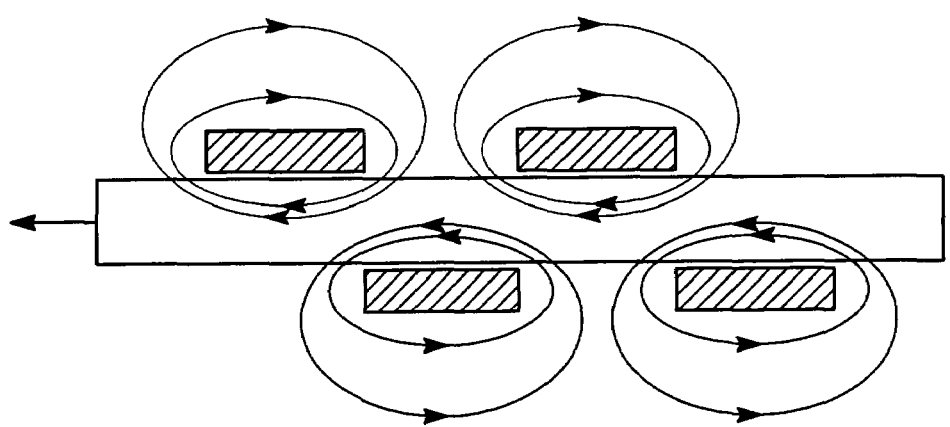

As shown in FIGS. 1 and 2, in the prior art, a coil around a magnetic material is used to generate magnetic field that "adds" up inside the magnetic material by using the same biasing current. The direction of flow of current in the top layer is opposite in the z-axis to that of the bottom layer, but the field lines below the top metal layer and above the bottom metal layer are confined in the magnetic field and will be along the same direction.

SUMMARY

In one embodiment, the invention includes an electronic stripe having a top metal layer without magnetic material therebetween, and a conductive path alternating between the top metal layer and the bottom metal layer, wherein the conductive path on the top metal layer is remote from the conductive path on the bottom metal layer to reduce magnetic flux interference.

In another embodiment, the invention includes an electronic stripe card having a first conductive path to emit a first magnetic field to mimic a first track in a magnetic card, a second conductive path to emit a second magnetic field to mimic a second track in the magnetic card, a swipe sensor to detect when the electronic stripe card is swiped past a read head, and an interleaved track driver circuit responsive to the swipe sensor, to drive the first and second conductive paths one at a time.

DESCRIPTION OF EMBODIMENTS

In the following detailed description, reference is made to the accompanying drawings that show, by way of illustration, various embodiments of an invention. These embodiments are described in sufficient detail to enable those skilled in the art to practice the invention. It is to be understood that the various embodiments of the invention, although different, are not necessarily mutually exclusive. For example, a particular feature, structure, or characteristic described in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense. In the drawings, like numerals refer to the same or similar functionality throughout the several views.

Figure 3:
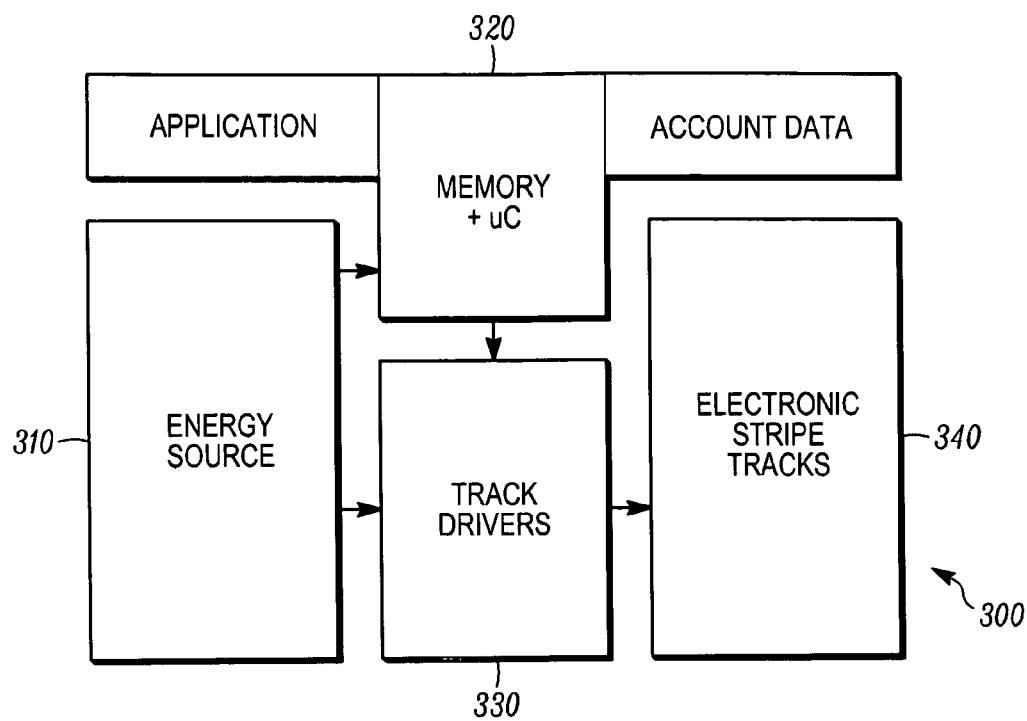
FIGS. 3 and 4 show diagrams of electronic stripe cards in accordance with various embodiments of the present invention.
Figure 4:
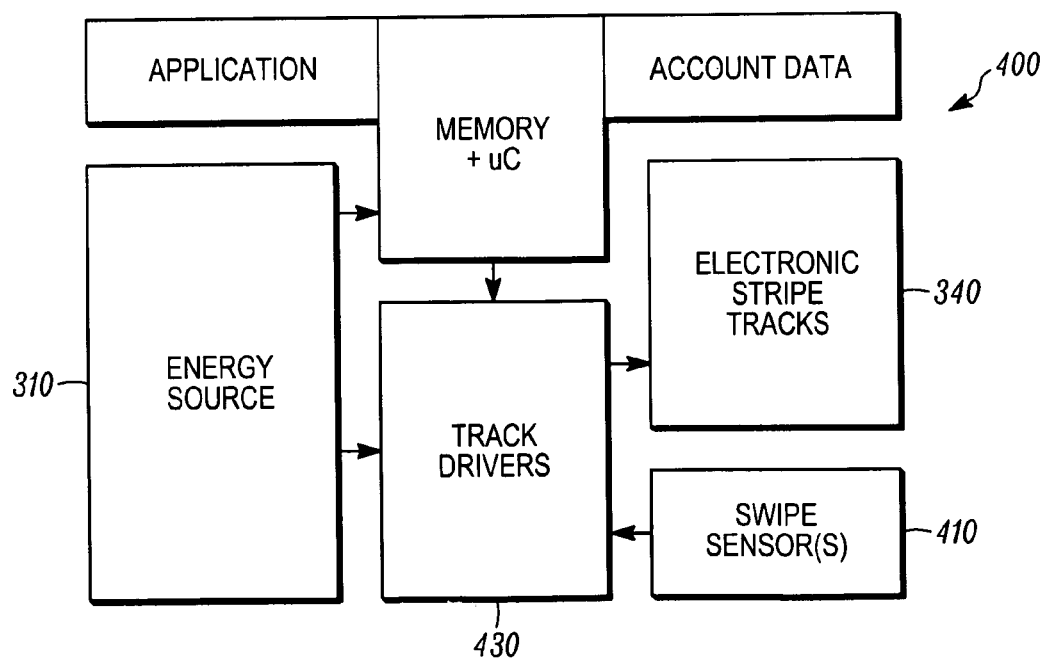

FIGS. 3 and 4 show diagrams of electronic stripe cards in accordance with various embodiments of the present invention. Electronic stripe card 300 (FIG. 3) includes memory and microcontroller 320, energy source 310, track drivers 330, and electronic stripe tracks 340. Memory and microcontroller 320 may include application software, account data, and any other software and data. Energy source 310 may be any suitable energy source for providing energy to the remaining devices shown in FIG. 3. Electronic stripe tracks 340 may be implemented using magnetic field generation circuits described with reference to later figures. Further, electronic stripe tracks 340 may include multiple magnetic field generation circuits to generate magnetic fields corresponding to multiple magnetic card tracks. Track drivers 330 provide driving signals to electronic stripe tracks 340 to effect the generation of magnetic fields.

Electronic stripe card 400 (FIG. 4) includes memory and microcontroller 320, energy source 310, and electronic stripe tracks 340, all of which are described in the previous paragraph. Electronic stripe card 400 also includes track drivers 430 and swipe sensor 410.

Swipe sensor 410 may sense when the card is swiped past a magnetic card reader head, and track drivers 430 may operate in response thereto. For example, with input from swipe sensor 410, the microcontroller (uC) can sense when the track driving needs to begin and/or end, making the energy consumption much lower. Swipe sensor 410 may be implemented using optical sensors, mechanical sensors or electrical sensors. Example embodiments of swipe sensors are described further below with reference to later figures. Without a swipe sensor, the track drivers continuously drive the electronic stripes. This will consume energy from the energy source irrespective of if the card is being swiped or not.

Figure 5:
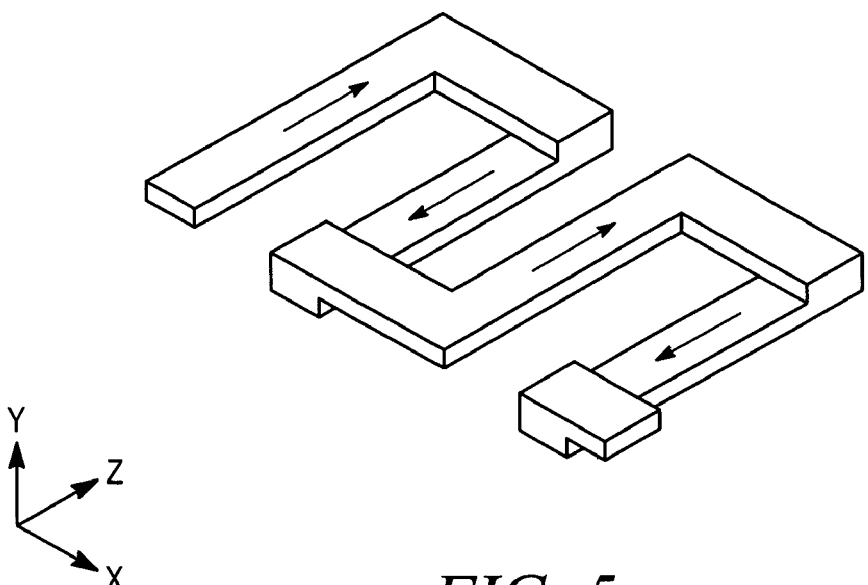
FIGS. 5-8 show magnetic field generation in accordance with various embodiments of the present invention.
Figure 6:
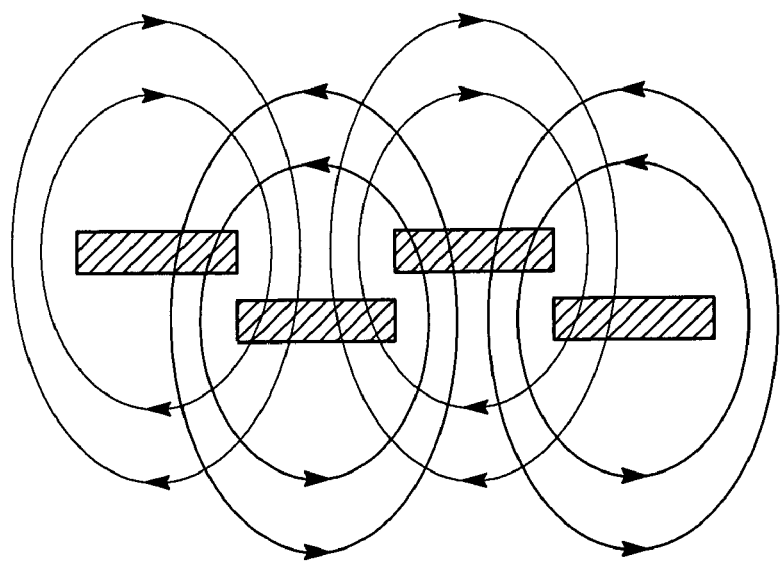

FIGS. 5-8 show magnetic field generation in accordance with various embodiments of the present invention. As shown in FIGS. 5 and 6, flux lines spread out due to absence of magnetic material and therefore are in the opposite direction resulting in canceling of the magnetic fields due to current flow in the top with that of the bottom metal layers.

Figure 7:
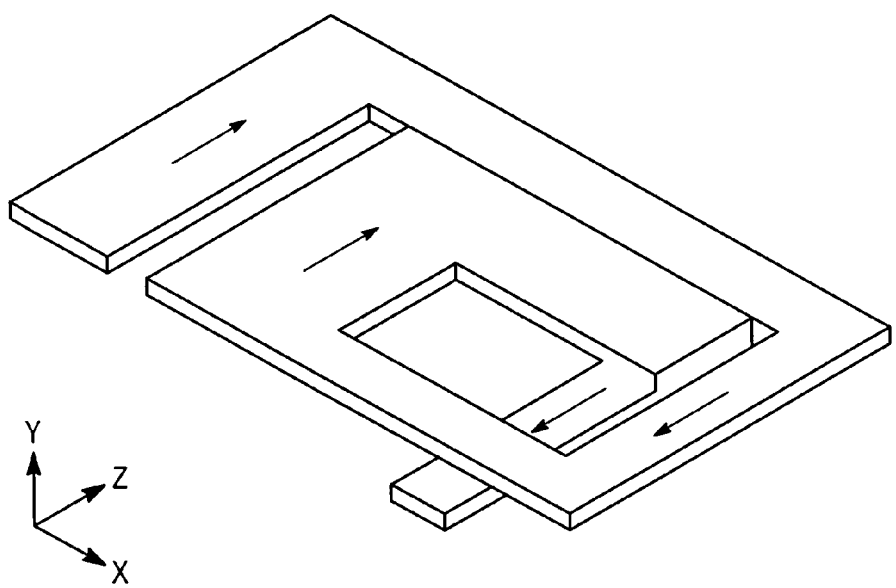
Figure 8:
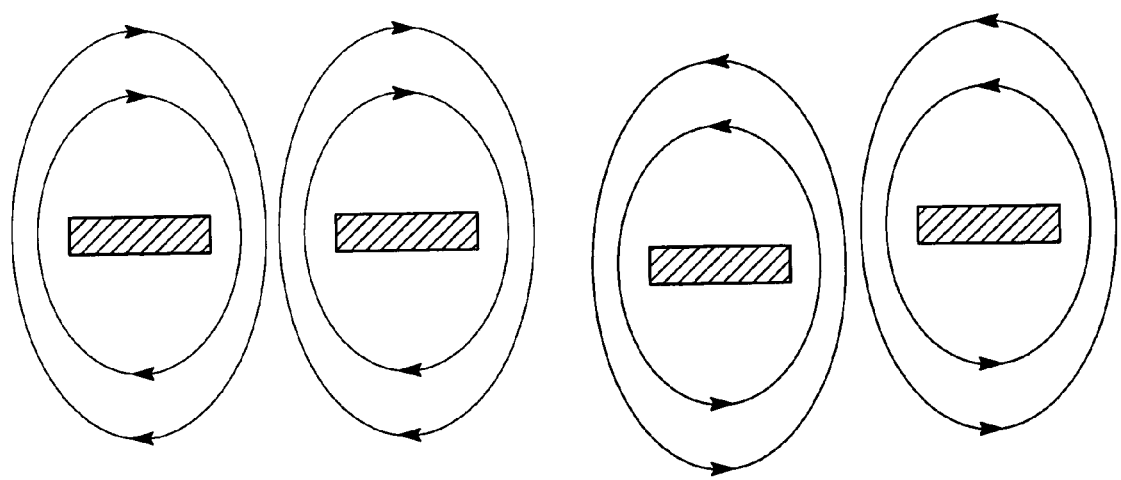

As shown in FIGS. 7 and 8, in various embodiments of the present invention, the same bias current is used without magnetic material, while preventing the canceling of field lines by re-routing the bottom metal layer further away along the x-axis. Physical separation of the bottom with the top layers ensures that the flux lines do not cancel each other. The flux lines in the top metal layer might also add-up. Note that the metal width along the x-axis for the top and bottom layers do not have to be the same. This design ensures that the metal conductors in one side of the layout carry current in the same direction. Use of more than two layers of metal can help improve this effect.

Various embodiments of the present invention can be used as the design for electronic stripe tracks 340 (FIGS. 3, 4) to reuse the same bias current and generate magnetic field(s) that mimic the standard magnetic stripe functionality. This solution does not require magnetic material. Further, this solution does not suffer from flux cancellation.

Figure 9:
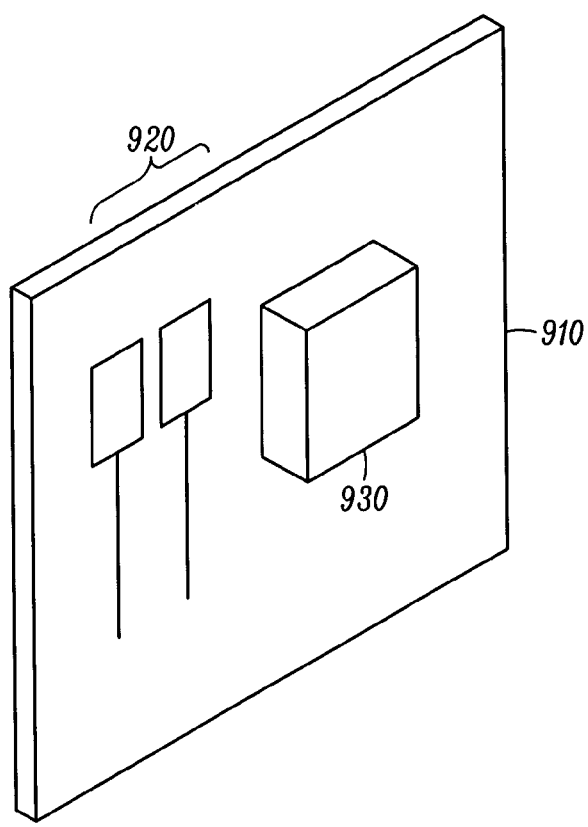
FIG. 9 shows swipe sensor contacts and a read head in relation to an electronic stripe card.

FIG. 9 shows swipe sensor contacts and a read head in relation to an electronic stripe card. Swipe sensor contacts 920 are shown as two metal islands on electronic stripe card 910. Read head 930 represents a metal read head in a magnetic card reader such as a point-of-sale (POS) card reader. Since the read head is made out of metal, a swipe sensor that resides on the card with two metal islands spaced closely can be effective. When the read head is in between the two metal islands they will be shorted to each other via the read head. Any other position of the read head will leave these two lines open. By sensing the impedance or by measuring corresponding current/voltage between these two metal islands a swipe sensor such as swipe sensor 410 (FIG. 4) may be implemented. During the swiping action of electronic stripe card 910 through a card reader, the sensor is activated when read head 930 is on top of, and in between, the two metal islands shown at 920.

Figure 10:
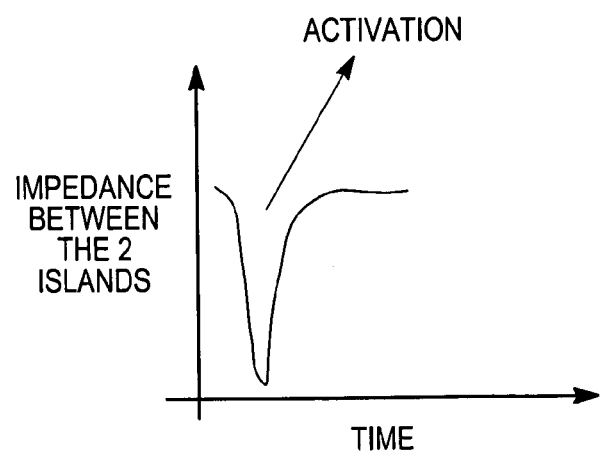
FIG. 10 shows a plot of swipe sensor impedance.

FIG. 10 shows a plot of swipe sensor impedance. As shown in FIG. 10, the impedance between the two islands may drop when the read head shorts the two islands together. The sensor may detect this condition and activate track driving to generate magnetic field(s) to mimic a standard magnetic card.

In some embodiments, multiple swipe sensors exist. For example, one swipe sensor may be on each end of electronic stripe card 910. In these embodiments, track driving may start when the first sensor is activated, and track driving may stop when the second sensor is activated. Alternatively, the activation of the first sensor may trigger the driving of the stripe and the driving is automatically stopped after sending all the data to the electronic stripe a predetermined number of times. In addition, swipe sensors may be on one or both sides of the electronic stripe card.

Figure 11:
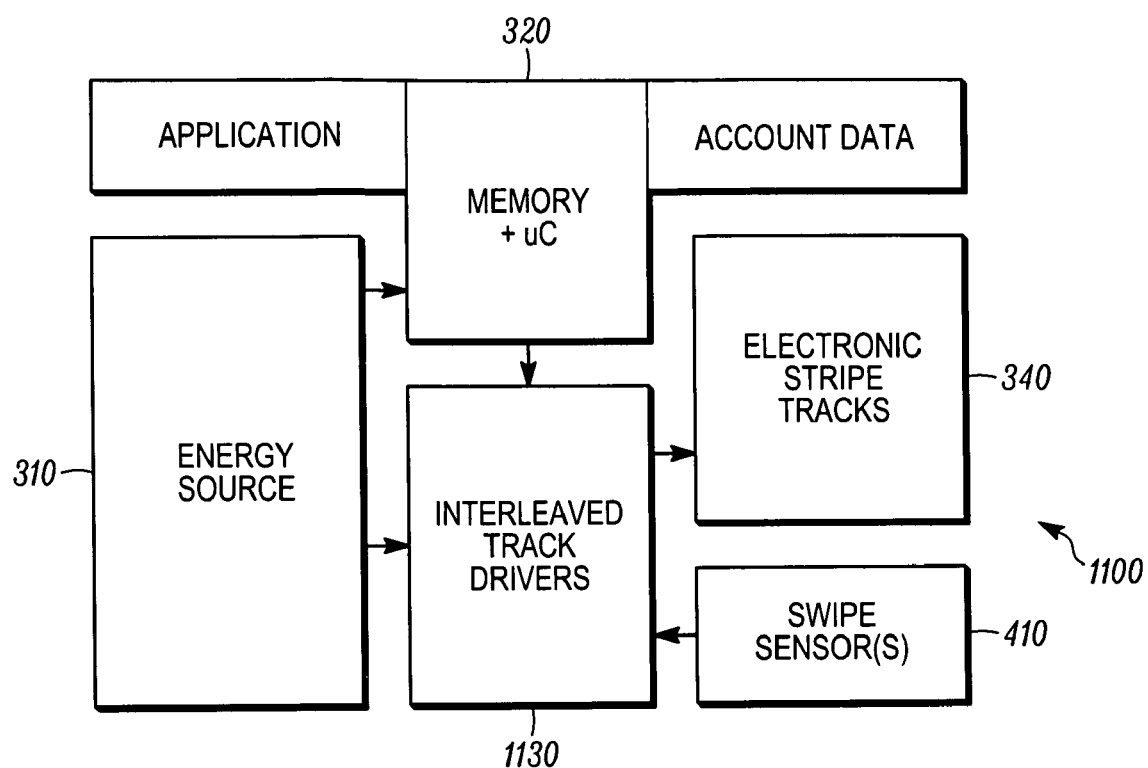
FIG. 11 shows a diagram of an electronic stripe card in accordance with various embodiments of the present invention.

FIG. 11 shows a diagram of an electronic stripe card in accordance with various embodiments of the present invention. Electronic stripe card 1100 includes memory and microcontroller 320, energy source 310, electronic stripe tracks 340, and swipe sensors 410, all of which are described above. Electronic stripe card 1100 also includes interleaved track drivers 1130.

Most financial cards have two tracks of data. The data stored in these two tracks are read by two independent card reader circuits in the card reader. In a traditional magnetic stripe card since the data for the two tracks are physically recorded on the stripes they are read simultaneously. In various electronic stripe embodiments of the present invention, the data is not stored physically in the stripes, but rather electronically programmed one bit at a time. Since the time slot required for a bit is usually much smaller compared to the time it takes to swipe the entire card, it is possible to drive one track at a time. This is accomplished by first sending the entire data for one of the tracks, followed by the entire track data for the next track. When no data is sent, the track does not consume any current. For a two track system, track interleaving reduces the power consumption by a factor of two and completely eliminates any cross-talk between tracks.

Track interleaving can be done with or without swipe sensors. In some embodiments, there are two swipe sensors for the whole card—one on each end. In these embodiments, activation of one of the swipe sensors may lead to driving of the tracks in an interleaved fashion. The driving can stop after driving the tracks for a predetermined number of times or after the activation of the other swipe sensor. In some embodiments, swipe sensors are dedicate to each track. For example, when one swipe sensor is swiped past a read head, a first track may be driven, and when a second swipe sensor is swiped past the read head, a second track may be driven. Track interleaving for power saving is also valid for designs with more than two tracks.

The various embodiments described herein may be applicable to financial cards, credit/debit cards, and other such cards. Further, the various embodiments may be used in merchant point-of-sale retail locations, automatic teller machine (ATM) locations, or wherever such cards may be read. Still further, the various embodiments may be used for purposes other than financial cards. For example, the various embodiments may be used for access control.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An electronic stripe card comprising:
a top metal layer and a bottom metal layer without magnetic material therebetween; and
a conductive path alternating between the top metal layer and the bottom metal layer, wherein the conductive path on the top metal layer is remote from the conductive path on the bottom metal layer to reduce magnetic flux interference.

2. The electronic stripe card of claim 1 wherein the conductive path on the top metal layer has a different width from the conductive layer on the bottom metal layer.

3. The electronic stripe card of claim 1 further comprising track driving circuitry to provide current to the conductive path.

4. The electronic stripe card of claim 3 further comprising a swipe sensor to detect when the electronic stripe card is swiped past a read head.

5. The electronic stripe card of claim 4 wherein the track driving circuitry is responsive to the swipe sensor to active when the electronic stripe card is swiped past the read head.

6. The electronic stripe card of claim 5 further comprising a second swipe sensor.

7. The electronic stripe card of claim 6 wherein the track driving circuitry is responsive to the second swipe sensor to deactivate the electronic stripe when the second swipe sensor is swiped past the read head.

8. The electronic stripe card of claim 1 further comprising a second conductive path alternating between the top metal layer and the bottom metal layer.

9. The electronic stripe card of claim 8 further comprising interleaving track driving circuitry to provide current to the conductive path and the second conductive path in an interleaved fashion.

10. An electronic stripe card comprising:
a first conductive path to emit a first magnetic field to mimic a first track in a magnetic card;
a second conductive path to emit a second magnetic field to mimic a second track in the magnetic card;
a swipe sensor to detect when the electronic stripe card is swiped past a read head; and
an interleaved track driver circuit responsive to the swipe sensor, to drive the first and second conductive paths one at a time.

11. The electronic stripe card of claim 10 further comprising a top metal layer and a bottom metal layer without magnetic material therebetween.

12. The electronic stripe card of claim 11 wherein the first conductive path comprises a conductive path alternating between the top metal layer and the bottom metal layer, wherein the conductive path on the top metal layer is remote from the conductive path on the bottom metal layer to reduce magnetic flux interference.

13. The electronic stripe card of claim 12 wherein the conductive path on the top metal layer is a different width from the conductive path on the bottom metal layer.

14. The electronic stripe card of claim 10 further comprising a second swipe sensor.

15. The electronic stripe card of claim 14 wherein the interleaved track driver circuit is responsive to the second swipe sensor to stop driving the first and second conductive paths.

16. A method comprising:
detecting that a swipe sensor has been swiped past a read head; and
driving a first conductive path to mimic a first magnetic track and driving a second conductive path to mimic a second magnetic track, wherein the driving of the first and second conductive paths is interleaved.

17. The method of claim 16 further comprising detecting that a second swipe sensor has been swiped past the read head.

18. The method of claim 17 further comprising stopping driving when the second swipe sensor is detected.

19. The method of claim 16 wherein driving a first conductive path comprises driving a first conductive path alternating between a top metal layer and a bottom metal layer, wherein the conductive path on the top metal layer is remote from the conductive path on the bottom metal layer to reduce magnetic flux interference.

20. The method of claim 16 wherein driving a first conductive path comprises driving a first conductive path alternating between a top metal layer and a bottom metal layer without magnetic material therebetween, wherein the conductive path on the top metal layer is remote from the conductive path on the bottom metal layer to reduce magnetic flux interference.

* * * * *